(12) United States Patent
Wyser

(10) Patent No.: US 8,685,560 B2
(45) Date of Patent: Apr. 1, 2014

(54) BATTERY

(75) Inventor: Philipp Wyser, Appenzell (CH)

(73) Assignee: Swissbatt AG, Appenzell Steinegg (CH)

( * ) Notice: Subject to any disclaimer, the term of this patent is extended or adjusted under 35 U.S.C. 154(b) by 308 days.

(21) Appl. No.: 13/293,701

(22) Filed: Nov. 10, 2011

(65) Prior Publication Data

US 2012/0164515 A1 Jun. 28, 2012

(30) Foreign Application Priority Data

Dec. 24, 2010 (EP) ..................................... 10405249

(51) Int. Cl.
*H01M 6/42* (2006.01)

(52) U.S. Cl.
USPC ............ 429/149; 429/153; 429/154; 429/185

(58) Field of Classification Search
USPC ......... 429/149, 152, 153, 154, 158, 159, 160, 429/163, 185, 174
See application file for complete search history.

(56) References Cited

U.S. PATENT DOCUMENTS

| | | | |
|---|---|---|---|
| 5,541,016 A | * | 7/1996 | Schumm, Jr. ................. 429/402 |
| 2004/0048146 A1 | * | 3/2004 | Adamson et al. ............... 429/83 |
| 2008/0241682 A1 | | 10/2008 | Huang et al. |
| 2011/0104561 A1 | * | 5/2011 | Kim et al. ..................... 429/181 |

FOREIGN PATENT DOCUMENTS

| | | |
|---|---|---|
| EP | 1 416 571 A | 5/2004 |
| GB | 2 016 199 A | 9/1979 |
| WO | 2010/107679 A2 | 9/2010 |

* cited by examiner

*Primary Examiner* — Raymond Alejandro
(74) *Attorney, Agent, or Firm* — Birch, Stewart, Kolasch & Birch, LLP

(57) ABSTRACT

The battery comprises a can, a cap, and a seal. The cap fits into the can to build a housing with a closed interior volume, and the seal sealing cap and can in relation to one another. A porous membrane spills the interior volume into two subcells with each subcell containing one or multiple layers of electrolyte and one or multiple layer structures. The latter comprise a conducting film at least partially coated with active material and contain one or more through-holes. The layer structure is parallel to the porous membrane and the conducting film is connected to either can or cap. This construction allows for a large area of contact between active material and electrolyte and as between electrolyte and porous membrane which result in a high performance of the battery.

17 Claims, 4 Drawing Sheets

BATTERY

FIELD OF THE INVENTION

Figure 1:
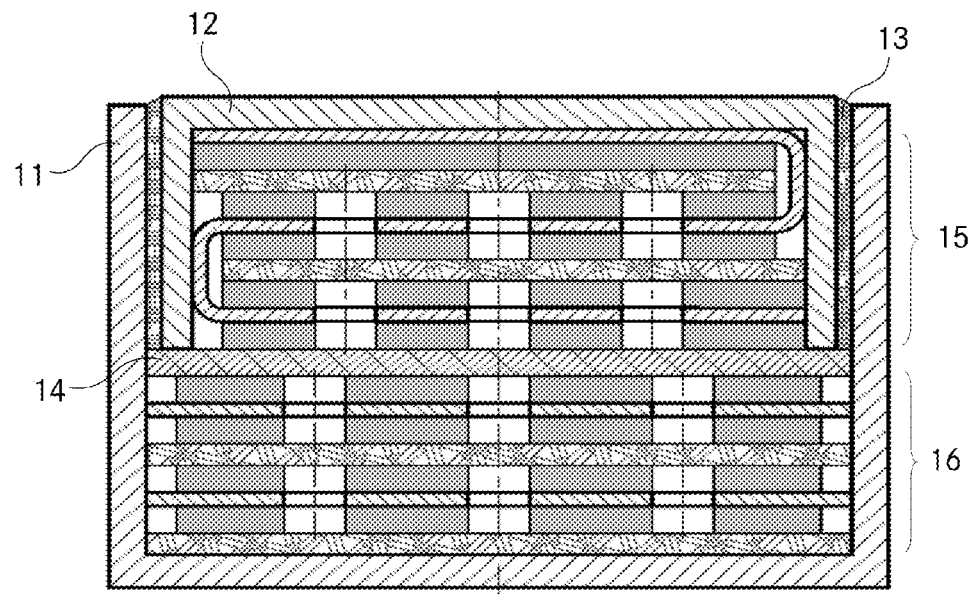

The invention pertains to a battery, comprising a can, a cap, and a seal, with the cap fitting into the can to build a housing with a closed interior volume, the seal sealing cap and can in relation to one another as well as a porous membrane parallel to main surfaces of can and cap splitting the interior volume into two subcells, with each subcell containing one or multiple layers of electrolyte and one or multiple layer structures, the latter comprising a conducting film which is at least partially coated with active material.

BACKGROUND OF THE INVENTION

Batteries in the form of button cells as either primary batteries (non-rechargeable) or accumulators (multiply rechargeable) are used regularly nowadays as independent and small power source in portable electronic devices requiring a long service life span, e.g. wristwatches, pocket calculators, and hearing aids. Like an ordinary battery they consist of a number of galvanic elements in parallel which, on closure of the circuit, generate an electric current. These are usually placed inside a cylindrical can which is then closed by a circular cap and a seal, the latter of which providing electric insulation between can and cap as well as airtight closure.

In state-of-the-art designs, the parallel series of the galvanic elements consists of concentric, hollow metal toroids with parallel, vertical walls. Each of those is coated on the inside with a layer of separator material (i.e. the salt bridge) and contains the cathode material. The anode material is placed between the toroids. To allow an exchange of ions between anode and cathode material, the vertical walls of the toroids are punctured by holes which are closed from the interior by the layer of separator material. Thus, the toroids can be conductively connected to the side and bottom of the can, which then become the positive pole, while the rings of anode material are conductively linked to the interior surface of the cap, creating the negative pole.

The design described above has many disadvantages. Firstly, the interior resistance of any galvanic cell is inversely proportional to the surface area of the separator layer in contact with both anode and cathode material. Puncturing the walls of the toroids to allow access of the anode material to the separator layer reduces the area where the chemical reaction can take place. Any working design is thus a compromise, balancing wall area against hole area to optimise the production of electric current. Secondly, while a conductive connection between toroids and can is easily feasible by placing the toroids directly on the bottom or wall of the can, the conductive link between the layers of anode material and the cap is more complex. It is often achieved by a series of lamellas welded to the interior underside of the cap and extending into the anode material. While a contact between these lamellas does not restrict the mode of operation, a contact between lamella and toroid would provide a short circuit and has to be strictly avoided. This can be achieved by a non-conductive filling material placed between the lamellas, which however complicate the assembly considerably. Thirdly, the relatively small sealing area between can and cap, while initially providing an airtight seal, is easily breached, allowing anode and insulating material to be spilled and reducing battery performance.

SUMMARY OF THE INVENTION

The task of the invention therefore is the construction of a battery, pertaining to the technical area mentioned in the introduction, which allows a simple but effective conductive connection between anode or cathode material and can or cap while maximising the surface area of the separator layer in contact with both anode and cathode material.

The solution of the task is provided by the characteristics of claim 1. According to the invention the one or multiple layer structures are arranged parallel to the porous membrane, whereas the conducting film is connected to cap or can respectively, and at least one of the one or multiple layer structures contains one or multiple common through-holes.

Together, the two subcells, namely an anodic subcell and a cathodic subcell, form an electrochemical cell.

An arrangement of the layer structures parallel to the porous membrane with electrolyte in between ensures an effective ion exchange between the two subcells by providing a large area of interaction between electrolyte and membrane. This in turn results in a very stable current generated by the battery as well as a high performance ratio—the hallmarks of high quality for a battery. Connecting the conductive film to can or cap is essential for an electron current to flow between anode and cathode since the electrons are freed inside the conductive films connected to the anode and have to travel via the cathode to the latter's conductive films. The common through-holes enable a good circulation of electrolyte and allow the ions produced on the far side of a layer structure, relative to the porous membrane, to reach the membrane at all, which again ensures a good performance of the battery.

In a preferred embodiment, the layer structure used in at least one of the subcells is in the shape of a number of discs connected by links and has a number of disc sides coated with active material. This allows for a maximisation of the surface area of the active material in contact with the electrolyte. Furthermore, a good conductance of electrons between the disks of conducting material is maintained through these links, which is a prerequisite for a high battery performance.

Alternatively, the conductive material can be in another form, which however can result in a poorer performance of the battery since the ratio between the surface of active material in contact with electrolyte and the area of conducting film is not optimal.

Preferably, one of the discs at the end of the layer structure is coated on only one side with active material while all the other discs are coated on both sides with active material. This enables a large-area connection between said disc and a main surface of can or cap, resulting in a very good transmission of electrons and thus a stable current.

In an alternative embodiment, all the discs of the layer structure are coated with active material on both sides, reducing the number and area of connections between conducting film and main surface of can or cap.

Advantageously, the content of at least one of the subcells is generated by stacking the discs of said layer structure on top of one another with electrolyte in between. This arrangement represents an optimal ratio of overall surface area to volume of the resulting subcell while at the same time maximising the area of contact between active material and electrolyte. As a result, a very high performance of the subcell thus built can be achieved. The present embodiment requires these links to be bendable to allow a placement of the disks one on top of another. At least one link between two disks is required, and this is the preferred choice as it provides for maximum flexibility when stacking the discs.

Alternatively, the layer structure can be used in a flat arrangement.

Preferably, the disc with an uncoated side is either on top or at the bottom of the subcell with the uncoated side facing away from the subcell. This maximises the area of contact between active material and electrolyte and further allows a large-area conductive connection between the subcell and a main surface of either can or cap resulting in a very high and stable flow of electrons, which in turn leads to a high battery performance.

Preferentially, the links are conductively connected to the inside wall of either can or cap. As a result, the electron current has multiple different ways of flowing from conducting film to either can or cap, enhancing the performance of the subcell. Furthermore, the electrons can flow from each disk of conducting material directly to can or cap, avoiding an accumulation of electrons in those disks conductively connected to can or cap. The latter would limit battery performance and might lead to an unstable current.

Alternatively, the links only serve to conduct electrons from one disk coated with active material to another and ultimately to the conductive connection of the conducting film with can or cap.

Preferably, the disc with only one side coated with active material is conductively connected to either the interior main surface of the cap or the interior main surface of the can. Such a large-area conductive connection between conducting film and can or cap ensures an efficient and very stable electron current as well as reducing problems resulting from accumulation of electrons at such a connection.

In a second preferred embodiment, the layer structure used in at least one of the subcells comprises a number of conducting film discs being substantially in the shape of the main surfaces of can and cap and coated with active material on at least one side. This results in a maximisation of the area of contact between active material and electrolyte and thus a high battery performance. In contrast to the first embodiment described above, the present embodiment does not include a direct electrical connection between the discs of conducting film.

Alternatively, these film discs are in any shape other than substantially the main surfaces, which however reduces the area of contact between active material and electrolyte.

Preferably, the conducting film is coated only partially with active material so as to leave an area adjacent to the edge of the film disc free of active material. Such a form of coating maximises the area of contact between active material and electrolyte. Furthermore, by avoiding contact between stiff solid materials, i.e. active material and inner wall of can or cap, which results in microscopic voids, it allows a very good utilisation of available volume.

In an alternative embodiment, the conductive film is coated on both sides completely with active material.

Advantageously, the contents of at least one of the subcells is generated by stacking multiple layer structures on top of each other with a layer of electrolyte in between. Such an arrangement maximises the area of contact between active material and electrolyte as well as resulting in a good ratio of overall surface to volume of the subcell.

Alternatively, the layer structures are placed side by side, encompassed by a layer of electrolyte. This however leads to a large overall surface of the sub cell with reduced volume.

Preferably, the outer edge of the conducting film is conductively linked to the inside wall of either can or cap. This manner of connecting the conducting film to the inside wall of either can or cap represents not only a simple and effective way of allowing the electron current to flow to or from the conducting film but avoids accumulation of electrons in the conducting film by providing a very large cross section of the connection.

Alternatively, the conducting film is connected to the can or cap by means of usual conductors.

In a preferred embodiment, the through-holes are circular in shape and their axis is perpendicular to the disc surface. This represents the simplest way of producing connections between the two sides of a layer structure, allowing the circulation of electrolyte inside a sub cell.

Alternatively, the shape of the through-holes has any other geometric form and/or the direction of the axis of said through-holes deviates at a certain angle from perpendicularity.

Preferably, the number of through-holes is five and they are placed at the centre and the corners of a square, lozenge or rhomboid. Since these through-holes are necessary for a circulation of the electrolyte, increasing their number and cross section will result in a better circulation. On the other hand, however, each through-hole reduces the area of contact between active material and electrolyte. Therefore, an optimal number of through-holes balances the aforementioned effects. An even distribution of their locations allows for an efficient circulation. On a disk, an even placement of five holes results in them being at the centre and the corners of a square, lozenge or rhomboid, depending on the disk's deviation from circular geometry, with its centre coincident with the disk's centre.

In an alternative embodiment, a different number and/or placement of holes may be used.

In a preferred embodiment, the electrolyte is a solution, the solution being absorbed in a carrier. Such a carrier can be made e.g. of foamed plastic, fibrous gauze, sponge or the like. This enables good mixing of used and unused electrolyte as well as a fast and effective transport of ions to the porous membrane, both of which improves battery performance. Additionally, the carrier separates the layer structures and holds them in place within the battery housing.

Alternatively, e.g. a solid electrolyte such as a polymeric electrolyte can be used.

Preferably, both can and cap are of a cylindrical structure. Such a geometric form is by far the most common shape of a battery and is therefore suitable for widespread application. Furthermore, it allows for even distribution of the electrolyte. As a matter of course, other geometries are possible.

The following detailed descriptions as well as the collective patent claims result in further, preferred embodiments and combinations of characteristics of the invention.

SHORT DESCRIPTION OF THE DRAWINGS

Figure 2:
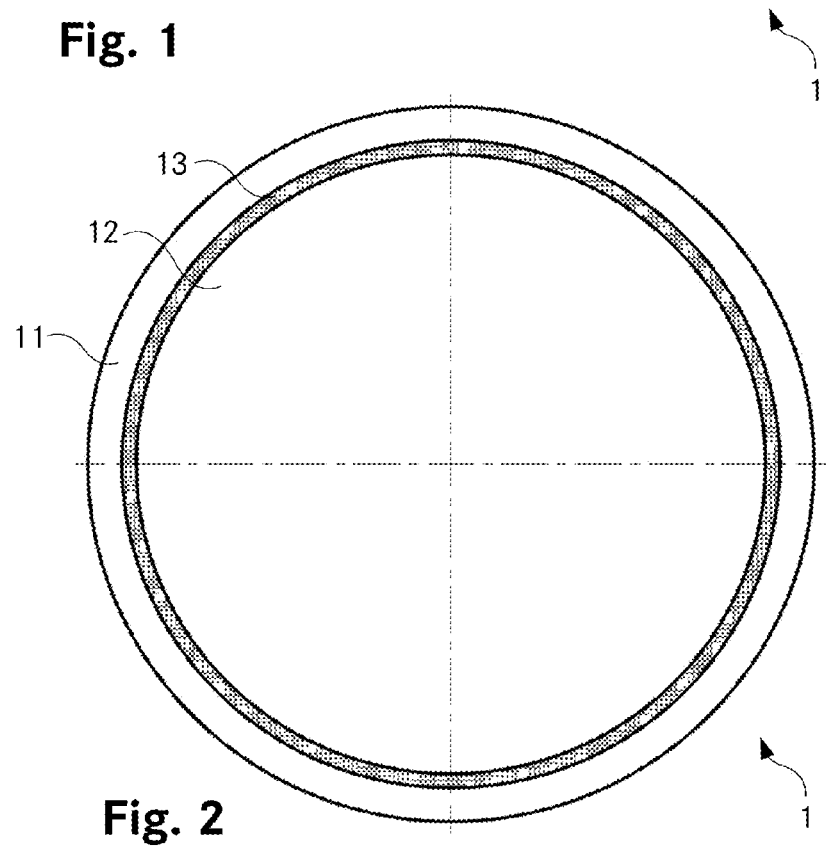
Figure 3:
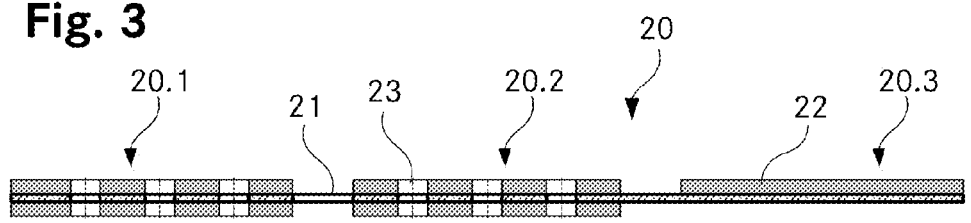
Figure 4:
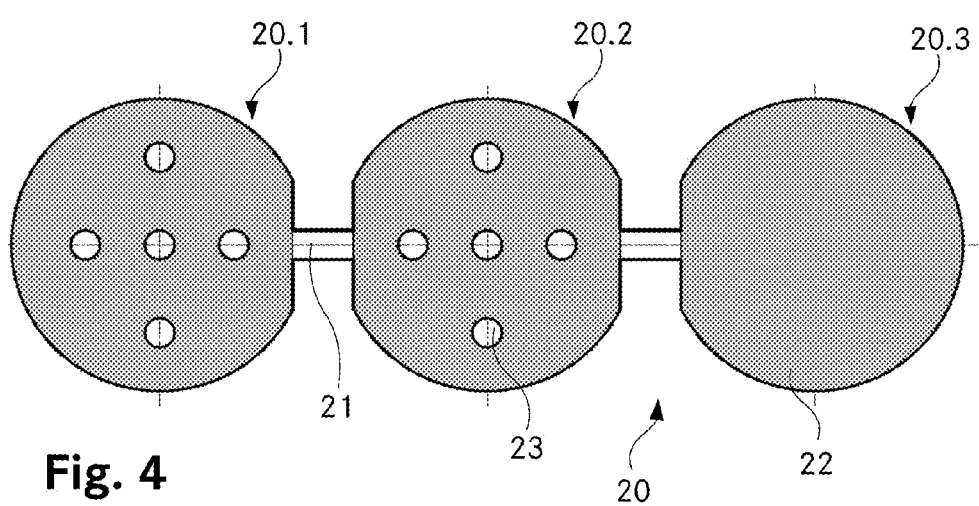
Figure 5:
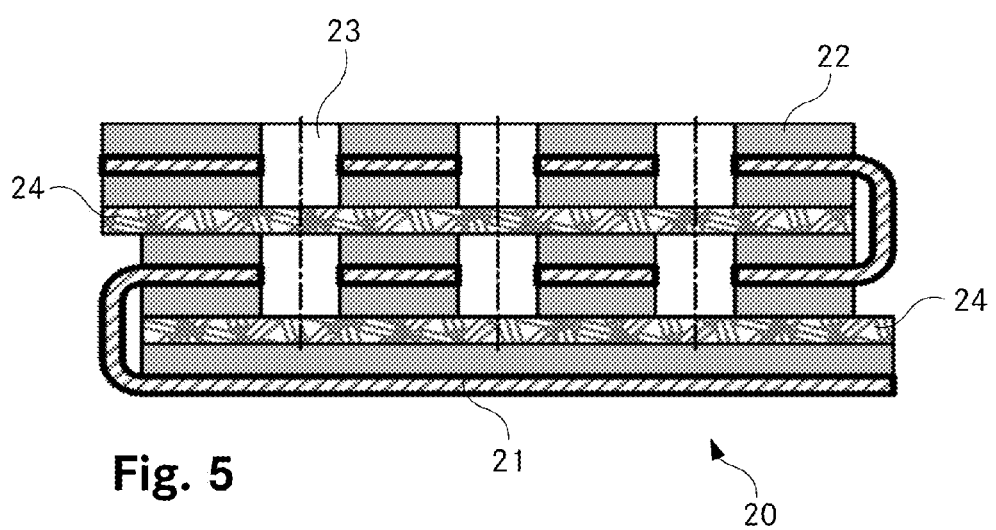
Figure 6:
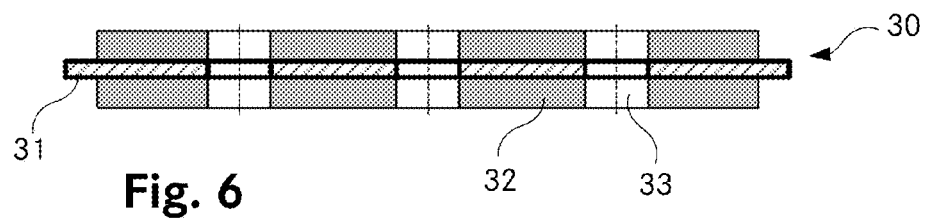
Figure 7:
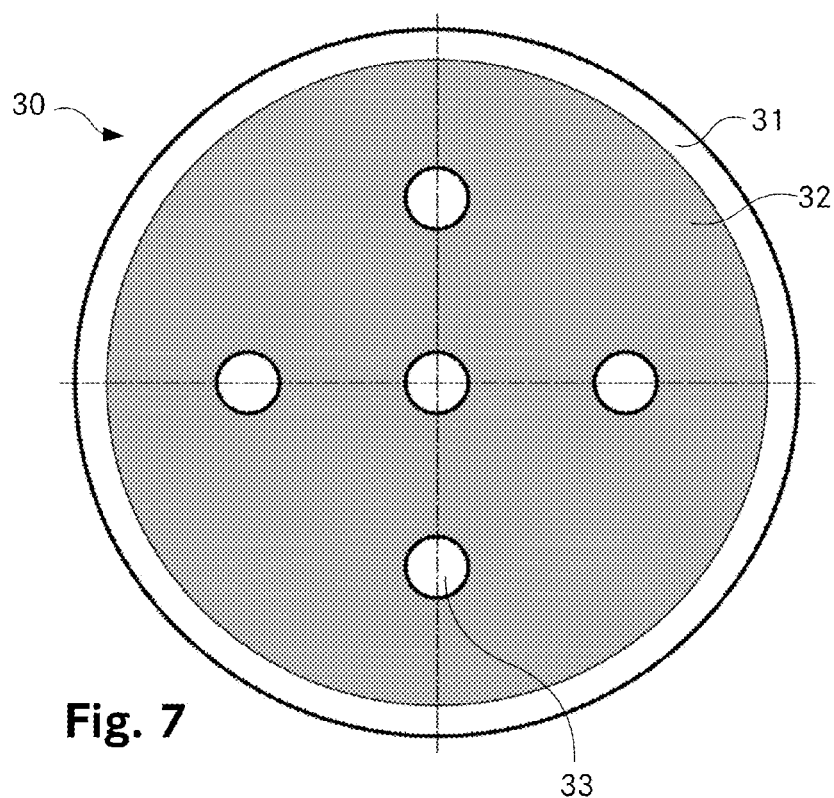
Figure 8:
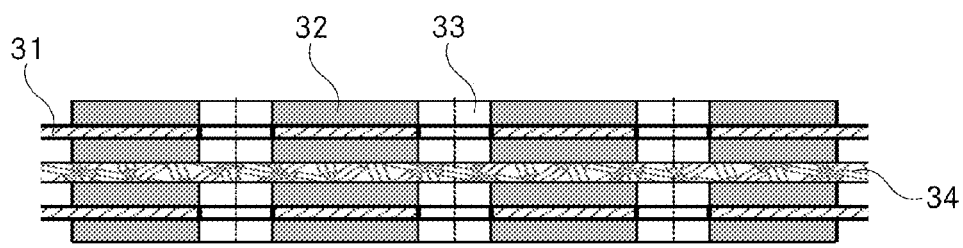
Figure 9:
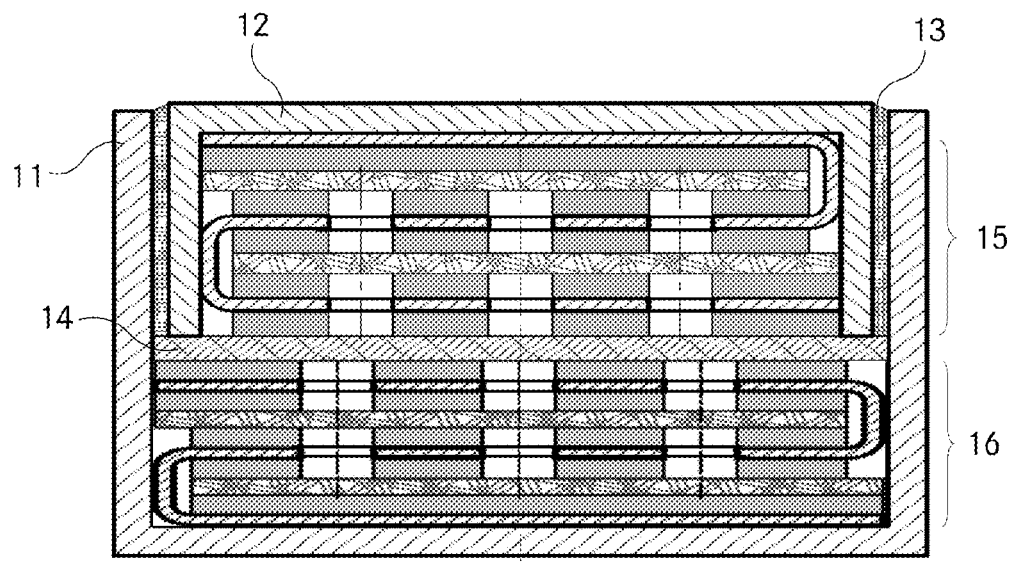
Figure 10:
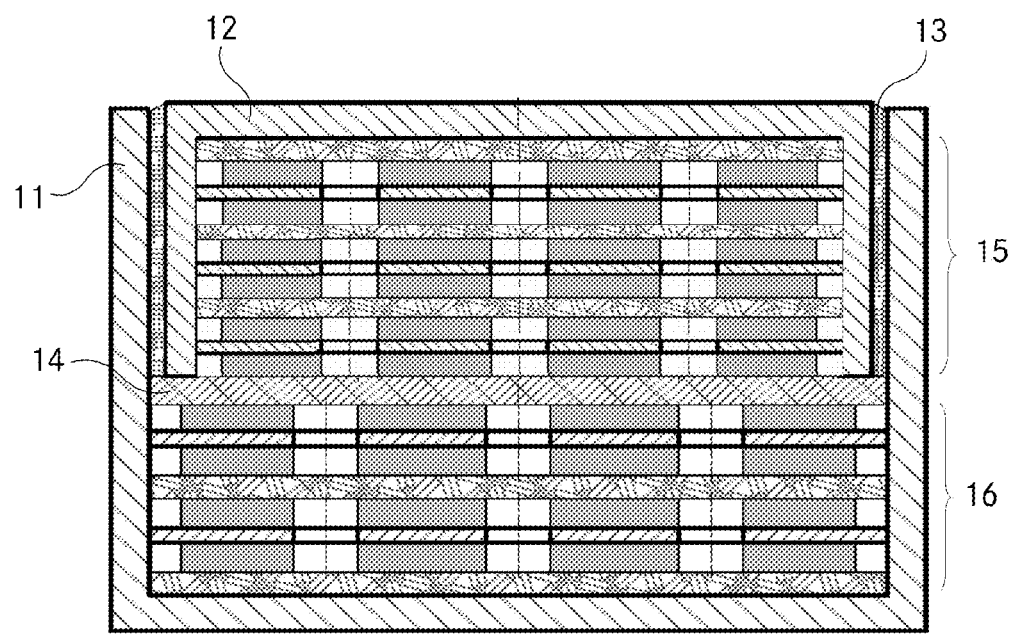

The drawings used to illustrate a possible embodiment of the invention show:

FIG. 1 a vertical cut through a battery according to an embodiment of the invention, FIG. 2 a top view of the battery, FIG. 3 a vertical cross section of a first embodiment of the conductive film, FIG. 4 a top view of the first embodiment of the conductive film, FIG. 5 a vertical cross section of the layer structure achieved with the first embodiment of the conductive film, FIG. 6 a vertical cross section of a second embodiment of the conductive film, FIG. 7 a top view of the second embodiment of the conductive film, FIG. 8 a vertical cross section of the layer structure achieved with the second embodiment of the conductive film, FIG. 9 a vertical cross section of a battery whose layer structures are achieved with the first embodiment of the conductive film, and FIG. 10 a vertical cross section of a battery whose layer structures are achieved with the second embodiment of the conductive film.

By principle, like parts in different drawings are referenced to with like signs.

POSSIBLE EMBODIMENTS OF THE INVENTION

FIGS. 1 and 2 show a vertical cross section and a top view, respectively, of a battery 1 comprising a can 11 and a cap 12 both made of metal, e.g. copper, with the cap 12 having about half the height of and fitting inside the can 11. The seal 13, based on a combination of organic polymer and cement, fixes cap 12 against can 11 in a gas-tight manner and covers the entire wall area between cap 12 and can 11 such that the two parts are being electrically insulated as well. Inside the volume thus created, a porous membrane 14, allowing ion transport, is situated parallel to top and bottom surfaces of can 11 and cap 12, dividing the volume into two subcells 15, 16. Each of these two subcells 15, 16 is filled with layer structures of conductive film in different embodiments coated with active material and electrolyte arranged in between. The battery shown has a diameter of about 2.5 mm and a height of about 1.1 mm. The layer structures are described in detail below.

FIGS. 3 and 4 show a vertical cross section and a top view, respectively, of a first embodiment of the layer structure 20, where the metallic conductive film 21 consists of three approximately circular discs 20.1, 20.2, 20.3 arranged in a straight line and connected by links. The material of the conductive film 21 may be e.g. aluminium for the cathode or copper for the anode. Two consecutive discs 20.1, 20.2 of conductive film 21 are coated with active material 22, e.g. graphite for use as anode or lithium cobalt oxide ($LiCoO_2$) for us as cathode, on both sides and contain five through-holes 23 perpendicular to their surface placed at the centre of the disk and at distances of approximately half a radius from the disk's centre at the corners of a lozenge. One of the discs 20.3 of conductive film 21 at the end of said row of disks is coated with active material 22 on only one side and does not contain any holes. The disks 20.1, 20.2, 20.3 are only approximately circular, having segments with chords perpendicular to the straight line connecting the centres of the disks 20.1, 20.2, 20.3 cut off on those sides on which they are connected to a neighbouring disk by a link. This peculiar form is necessary to generate space allowing a bending of the links and a concentric placement of the disks 20.1, 20.2, 20.3 one on top of another within a volume whose width is given by the diameter of the disks 20.1, 20.2, 20.3.

FIG. 5 shows a vertical cross section of said first embodiment of the layer structure 20 depicted in FIGS. 3 and 4, folded and with electrolyte 24 in between to generate a subcell. The disks of conductive film 21 and active material 22 are placed concentrically one on top of each other by bending the straps, such that the respective holes 23 correspond to one another, and with a layer of electrolyte 24 between every two disks. The layer is constituted by a carrier made from fibrous gauze. The composition of the electrolyte itself, absorbed within the gauze, is known as such from the prior art and is adapted inter alia to the material used for the electrodes. This figure also shows the necessity for the peculiar shape of the disks, i.e. the segments cut off, which serves to allow a bending of the links of conductive material 21 within a volume whose width is defined by the diameter of the disks. Furthermore, the disk coated on only one side and containing no holes is placed at the bottom of the layer structure with the uncoated side facing away from the layer structure, allowing, in the event of a placement inside can or cap, a direct and effective conductive connection between conductive material 21 and either can or cap.

FIGS. 6 and 7 show a vertical cross section and a top view, respectively, of a second embodiment of the layer structure 30 in the form of a circular disk of conductive material 31 which is coated on both sides by active material 32. This coating is effected in a manner leaving an annular area adjacent to the edge of the disk uncoated. Five through-holes 33 are placed at the centre of this composite disk and at distances of approximately half a radius from the disk's centre at the corners of a square.

FIG. 8 shows a subcell achieved by stacking second embodiments of the layer structure 30, depicted in FIGS. 6 and 7, concentrically one on top of another with a layer of electrolyte 34 in between.

FIG. 9 shows a vertical cross section of a battery whose subcells 15, 16 contain subcells both achieved by using the first embodiment of the layer structure, depicted in FIGS. 3 to 5. The two subcells are separated by a porous membrane 14 allowing ion transport between the two subcells 15, 16.

FIG. 10 shows a vertical cross section of a battery whose subcells 15, 16 contain subcells both achieved by using the second embodiment of the layer structure, depicted in FIGS. 6 to 8. Again, the layer structures are separated by a porous membrane 14.

The geometry of the layer structures can be modified within the scope of the invention, e.g. the discs of the first embodiment can be in an elliptic form where the small semimajor axis makes the cutting-out of segments unnecessary.

The discs in the first embodiment need not be aligned but can be in any arrangement allowing a connection by a link between two discs.

The number of discs used in either of the embodiments of the layer structure and the subcells can be varied at will, depending inter alia on the dimensions of the battery.

A subcell using the second embodiment of the layer structure can use an additional disc of conducting film coated only on one side with active material at the bottom or top of the pile of layer structures with the uncoated side facing away from the subcell, thereby creating a large-area conductive connection between conducting film and can or cap.

Subcells built using either of the two embodiments can contain an additional layer of electrolyte between the porous membrane and its adjacent layer of active material.

Summarising, we conclude that the invention creates a battery, which allows a simple but effective conductive connection between anode or cathode material and can or cap while maximising the surface area of the separator layer in contact with both anode and cathode material.

| List of reference signs | |
| --- | --- |
| 1 | battery |
| 11 | can |
| 12 | cap |
| 13 | seal |
| 14 | membrane |
| 15 | subcell |
| 16 | subcell |
| 20 | first embodiment of the layer structure |
| 21 | conducting film |
| 22 | active material |
| 23 | through-hole |
| 24 | electrolyte |
| 30 | second embodiment of the layer structure |

| List of reference signs | |
|---|---|
| 31 | conducting film |
| 32 | active material |
| 33 | through-hole |
| 34 | electrolyte |

The invention claimed is:

1. A battery, comprising a can, a cap, and a seal, with
   a) the cap fitting into the can to build a housing with a closed interior volume,
   b) the seal sealing cap and can in relation to one another,
   c) a porous membrane parallel to main surfaces of can and cap splitting the interior volume into two subcells,
   d) each subcell containing one or multiple layers of electrolyte and one or multiple layer structures, comprising a conducting film, at least partially coated with active material,
   whereas
   e) the one or multiple layer structures are arranged parallel to the porous membrane, whereas the conducting film is connected to cap or can respectively, and
   f) at least one of the one or multiple layer structures contains one or multiple common through-holes.

2. The battery according to claim 1, whereas the layer structure used in at least one of the subcells (15, 16) is in the shape of a number of discs connected by links and has a number of disc sides coated with active material.

3. The battery (1) according to claim 2, whereas one of the discs at the end of the layer structure is coated on only one side with active material while all the other discs are coated on both sides with active material.

4. The battery according to claim 3, whereas the content of at least one of the subcells is generated by stacking the discs of said layer structure on top of one another with electrolyte in between.

5. The battery according to claim 3, whereas the disc with an uncoated side is either on top or at the bottom of the subcell with the uncoated side facing away from the subcell.

6. The battery according to claim 4, whereas the links are conductively connected to the inside wall of either can or cap.

7. The battery according to claim 5, whereas the disc with only one side coated with active material is conductively connected to either the interior main surface of the cap or the interior main surface of the can.

8. The battery according to claim 1, whereas the layer structure used in at least one of the subcells comprises a number of conducting film discs being substantially in the shape of the main surfaces of can and cap and coated with active material on at least one side.

9. The battery according to claim 8, whereas the conducting film is coated only partially with active material so as to leave an area adjacent to the edge of the film disc free of active material.

10. The battery according to claim 8, whereas the contents of at least one of the subcells is generated by stacking multiple layer structures on top of each other with a layer of electrolyte in between.

11. The battery according to claim 10, whereas the outer edge of the conducting film is conductively linked to the inside wall of either can or cap.

12. The battery according to claim 1, whereas the through-holes are circular in shape and their axis is perpendicular to the disc surface.

13. The battery according to claim 1, whereas the number of through-holes is five and that they are placed at the centre and the corners of a square, lozenge or rhomboid.

14. The battery according to claim 1, whereas the electrolyte is a solution being absorbed in a carrier.

15. The battery according to claim 1, whereas both can and cap are of a cylindrical structure.

16. The battery according to claim 4, whereas the disc with an uncoated side is either on top or at the bottom of the subcell with the uncoated side facing away from the subcell.

17. The battery according to claim 16, whereas the disc with only one side coated with active material is conductively connected to either the interior main surface of the cap or the interior main surface of the can.

* * * * *